(12) United States Patent
Chergui et al.

(10) Patent No.: US 10,702,943 B2
(45) Date of Patent: Jul. 7, 2020

(54) METHOD AND DEVICE FOR THE RESISTANCE WELDING OF SANDWICH SHEETS

(71) Applicants: THYSSENKRUPP STEEL EUROPE AG, Duisburg (DE); THYSSENKRUPP AG, Essen (DE); THYSSENKRUPP SYSTEM ENGINEERING GMBH, Heilbronn (DE)

(72) Inventors: Azeddine Chergui, Dortmund (DE); Andreas Niesen, Klausen (DE); Thomas Ralle, Nonnweiler (DE); Peter Cornelius, Kasel (DE)

(73) Assignees: ThyssenKrupp Steel Europe AG, Duisberg (DE); ThyssenKrupp AG, Essen (DE); ThyssenKrupp System Engineering GMBH, Heilbronn (DE)

( * ) Notice: Subject to any disclaimer, the term of this patent is extended or adjusted under 35 U.S.C. 154(b) by 758 days.

(21) Appl. No.: 15/080,274

(22) Filed: Mar. 24, 2016

(65) Prior Publication Data

US 2016/0279730 A1 Sep. 29, 2016

(30) Foreign Application Priority Data

Mar. 26, 2015 (DE) .......................... 10 2015 104 635

(51) Int. Cl.
*B23K 11/11* (2006.01)
*B23K 11/16* (2006.01)
*B23K 103/16* (2006.01)

(52) U.S. Cl.
CPC ............. *B23K 11/115* (2013.01); *B23K 11/16* (2013.01); *B23K 2103/172* (2018.08)

(58) Field of Classification Search
CPC ....... B23K 11/11; B23K 11/115; B23K 11/00; B23K 11/16; B23K 2103/172
See application file for complete search history.

(56) References Cited

U.S. PATENT DOCUMENTS 4,117,296 A * 9/1978 Becker ................. B23K 11/163
219/113
4,368,372 A * 1/1983 Habenicht .......... B23K 11/3036
219/120

(Continued)

FOREIGN PATENT DOCUMENTS

CN 103534054 A 1/2014
CN 103702792 A 4/2014

(Continued)

OTHER PUBLICATIONS

English Language Abstract of DE102011109708.
Rough Machine Translation of DE548002.

*Primary Examiner* — Serkan Akar
*Assistant Examiner* — Ahmad Abdel-Rahman
(74) *Attorney, Agent, or Firm* — Avant Law Group, LLC

(57) ABSTRACT

The present disclosure concerns devices and methods for resistance welding sandwich sheets to other components. Many sandwich sheets include a thermoplastic material layer disposed between two metallic cover layers. The sandwich sheet and the other component may be secured relative to one another by a clamping arrangement. A region of the sandwich sheet to be welded may be heated by a preheating current to soften and displace the thermoplastic material layer when the cover layers are pressed together. With respect to the preheating current, a first electrode arrangement may at least temporarily contact an electrically conductive contacting region of the clamping arrangement such that the preheating current can flow via the clamping arrangement. The cover layers may be welded to the other (Continued)

component with a welding current via the first welding electrode of the first electrode arrangement and a second welding electrode of a second electrode arrangement.

20 Claims, 16 Drawing Sheets

(56) References Cited

U.S. PATENT DOCUMENTS

| | | | |
|---|---|---|---|
| 4,650,951 A | 3/1987 | Koga et al. | |
| 8,146,900 B2 * | 4/2012 | Miyashita | B23K 37/0435 269/32 |
| 8,502,105 B2 * | 8/2013 | Tanaka | B23K 11/115 219/86.22 |
| 2016/0254245 A1 * | 9/2016 | Wasserman | H01L 24/75 228/180.1 |
| 2018/0085846 A1 * | 3/2018 | Voigt | B23K 9/201 |

FOREIGN PATENT DOCUMENTS

| | | | |
|---|---|---|---|
| DE | 548002 C | 4/1932 | |
| DE | 102011109708 A1 | 2/2013 | |
| DE | 102012106521 A | 1/2014 | |
| FR | 2709083 A1 * | 2/1995 | B23K 11/063 |
| GB | 453009 A | 9/1936 | |
| JP | S60-213372 A | 10/1985 | |
| JP | S62-110878 A | 5/1987 | |
| JP | H03-221270 A | 9/1991 | |
| JP | 2009285678 A * | 12/2009 | B23K 11/0066 |

* cited by examiner

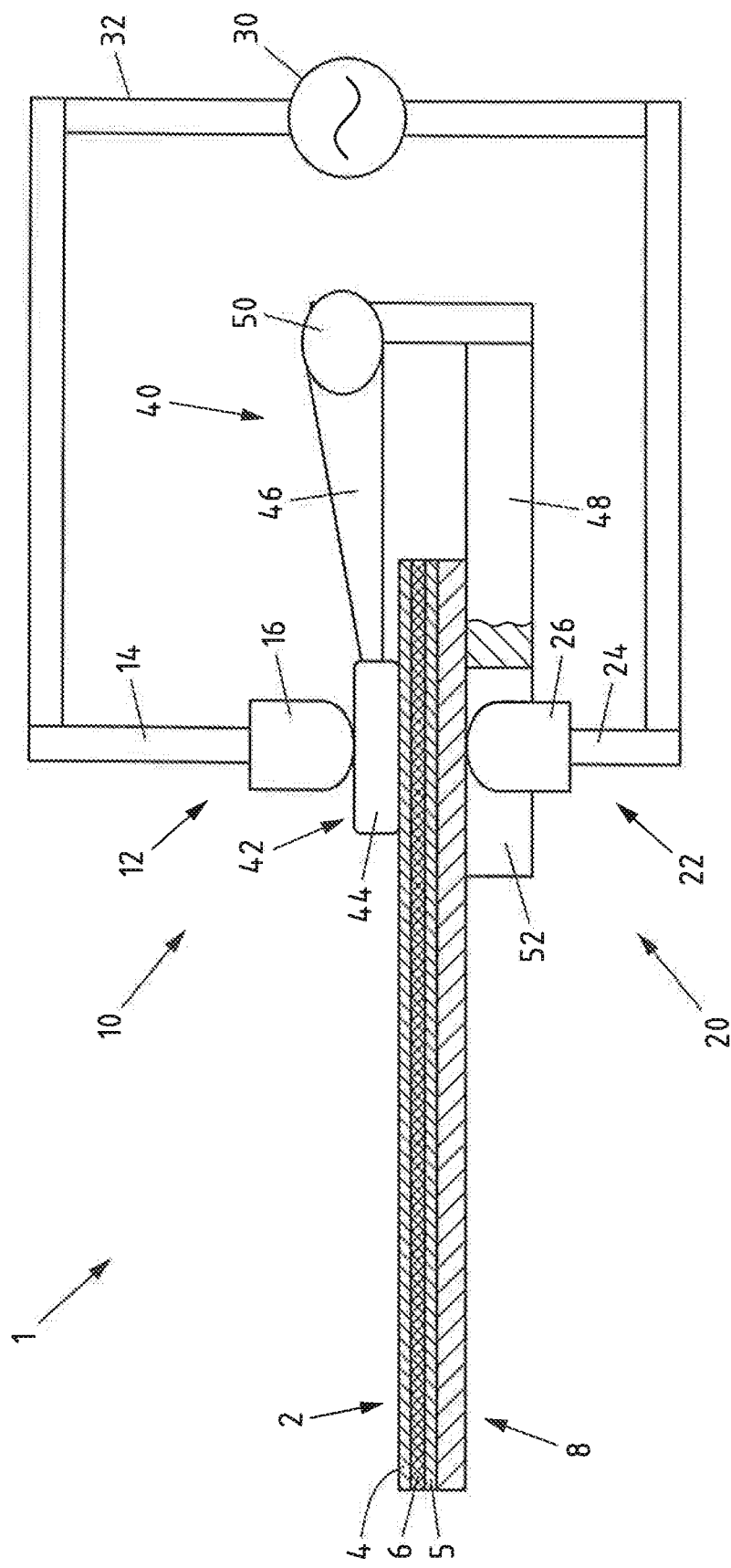

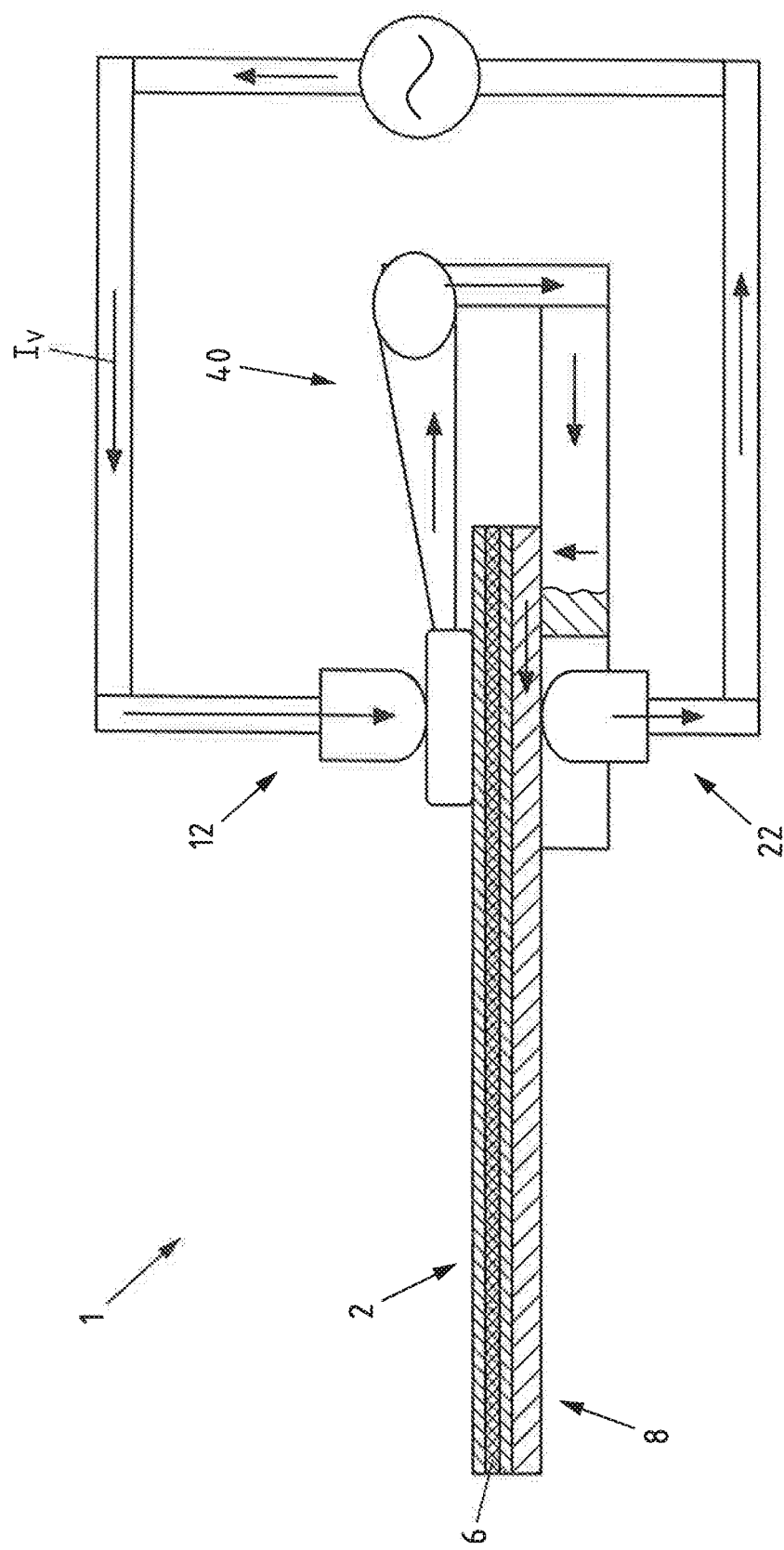

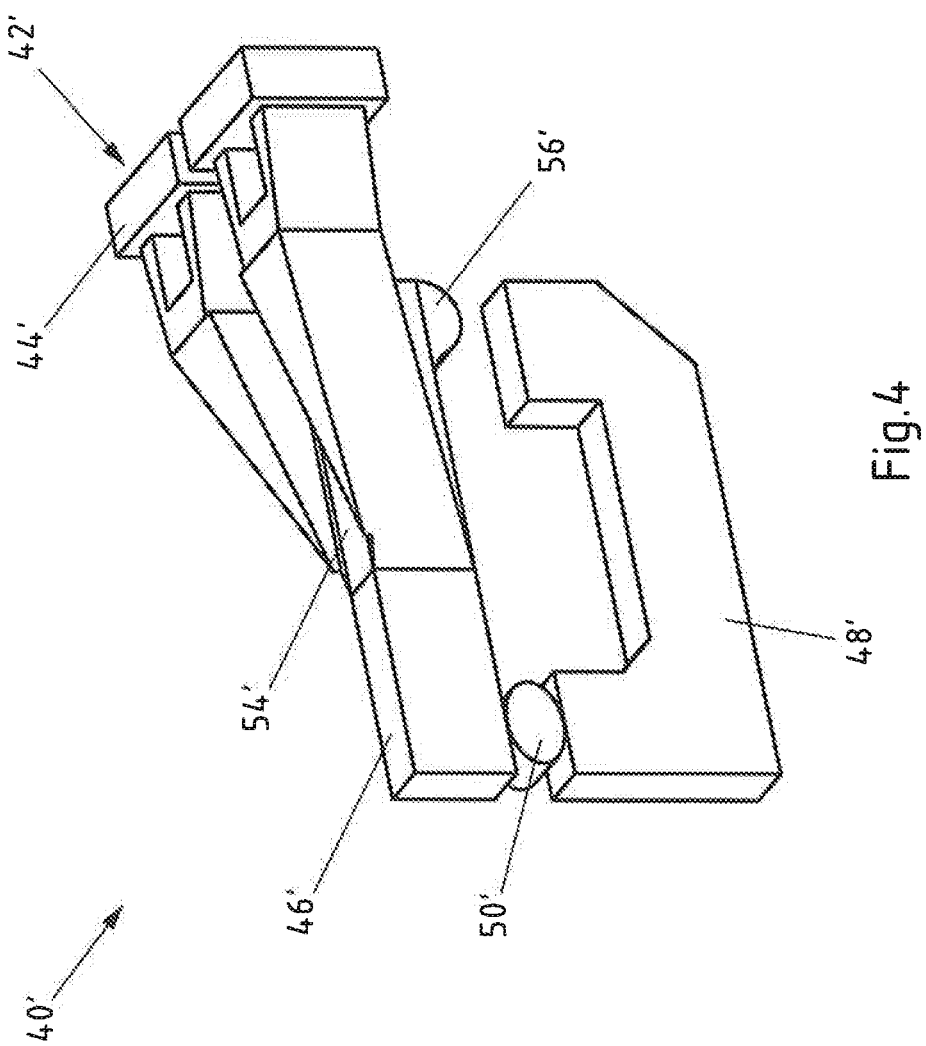

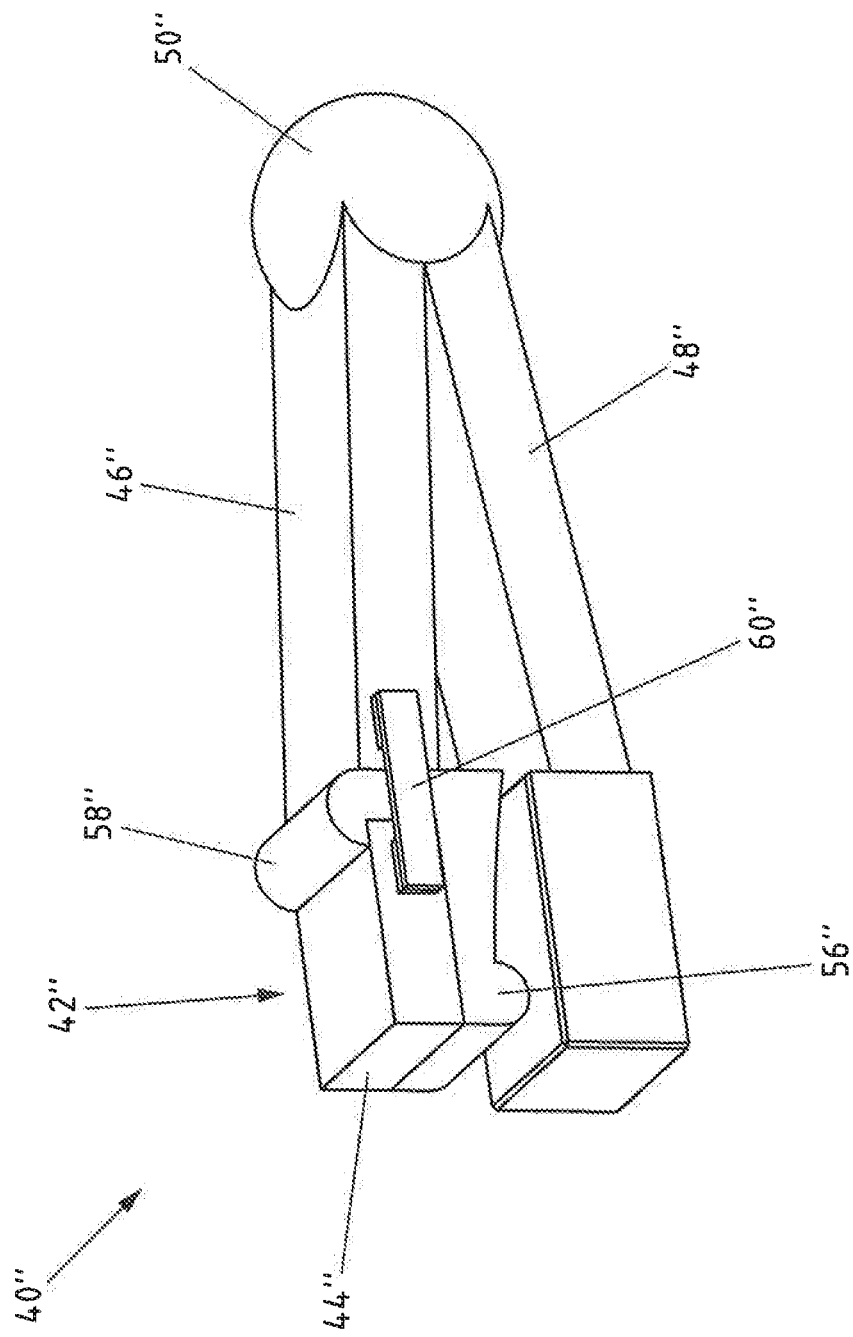

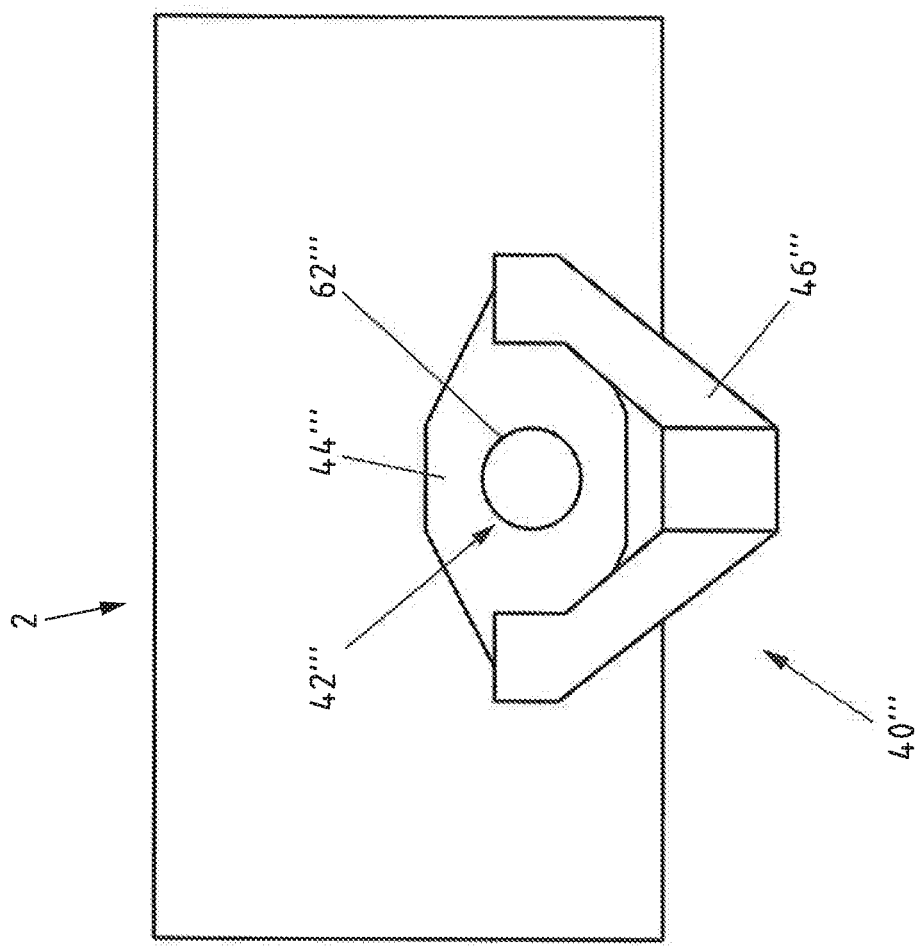

METHOD AND DEVICE FOR THE RESISTANCE WELDING OF SANDWICH SHEETS

CROSS REFERENCE TO RELATED APPLICATIONS

This application claims priority to prior-filed German Patent Application No. DE 10 2015 104 635.0 filed Mar. 26, 2015, the entire contents of which are hereby incorporated by reference herein.

FIELD

The present disclosure relates to methods for resistance welding sandwich sheets to other components.

BACKGROUND

The use of sandwich sheets having a thermoplastic material layer between two thin metallic cover layers is advantageous for the realization of lightweight structural concepts in the automotive sector, because with the use of such sheets the weight saving potentials in automobile construction can be further increased. Sandwich sheets can provide various advantageous, often mutually exclusive characteristics, which yield new weight saving potentials. For example, owing to the plastics layer, sandwich sheets have a considerably lower weight than solid sheets, and simultaneously provide high strength values. Furthermore, sandwich sheets have a sound-damping action and offer high rigidity.

A problem with the use of sandwich sheets, however, is that they have an electrically insulating plastics layer that gives rise to problems during welding processes with regard to the formation of a flawless welded connection. As a result, the integration of sandwich sheets into existing metal constructions has proven to be a problem. Owing to the lack of suitability of sandwich sheets for welding, for example for resistance welding or resistance spot welding, to other metallic components, sandwich sheets are therefore commonly adhesively bonded or mechanically joined to one another.

Nevertheless, to permit welding of sandwich sheets, German Patent Application No. DE 10 2011 109 708 A1 discloses a method for the joining of a sandwich sheet to a further metallic component. According to that method, the intermediate layer is melted in the connecting region and is displaced out of the connecting region, such that a welded connection can subsequently be produced by production of electrical contact between the component and the cover layers of the sandwich sheet. It is proposed that the heating of the joining regions be performed by temperature-controlled electrodes or pressing elements. The welding electrodes or pressing elements are, for this purpose, equipped for example with heating elements that are actuated separately by way of a regulator. The construction of the welding electrodes is thus relatively complex, because modifications to the welding electrode body and to the welding electrode cap are necessary. Furthermore, the rate of heating of the thermoplastic material layer needs to be increased in order to achieve the shortest possible cycle times.

U.S. Pat. No. 4,650,951 describes a method in which two sandwich sheets are connected by way of a remotely situated bypass circuit, such that a current can flow via said bypass circuit for heating purposes, and the sheets can subsequently be welded. This, however, leads to problems in the case of very lightweight sheets because, for example, the thin cover layers of the sandwich sheets can delaminate. Therefore, a method for the resistance welding of two composite sheets is proposed, which method uses two welding electrodes which are heated by heating elements arranged around the welding electrodes and which thus, before the welding process itself begins, warm up and displace the plastics layer situated between the cover layers. This, too, results in a modification of the welding electrodes.

German Patent No. DE 548 002 C discloses a method in which a clamp device situated remote from the welding electrode is used to bypass insulating lacquer, paper, or scale layers of the sheets to be welded and in order to burn off the insulating layers, such that welding is made possible. This, however, can lead to damage and delamination of the sandwich sheets. Furthermore, the welding result may be dependent on positioning of the clamp device, which leads to non-uniform welding processes.

Accordingly, there is a need for methods and devices for performing resistance welding sandwich sheets simply, reliably, and with short cycle times.

BRIEF DESCRIPTION OF THE FIGURES

FIGS. 1a-c are schematic sectional views of an example device for performing an example method.

FIG. 4 is a perspective view of a clamping arrangement of FIG. 3.

FIG. 6 is a perspective view of a clamping arrangement of FIG. 5.

FIG. 8 is a partial plan view of the clamping arrangement from FIG. 7.

DETAILED DESCRIPTION

Figure 1C:
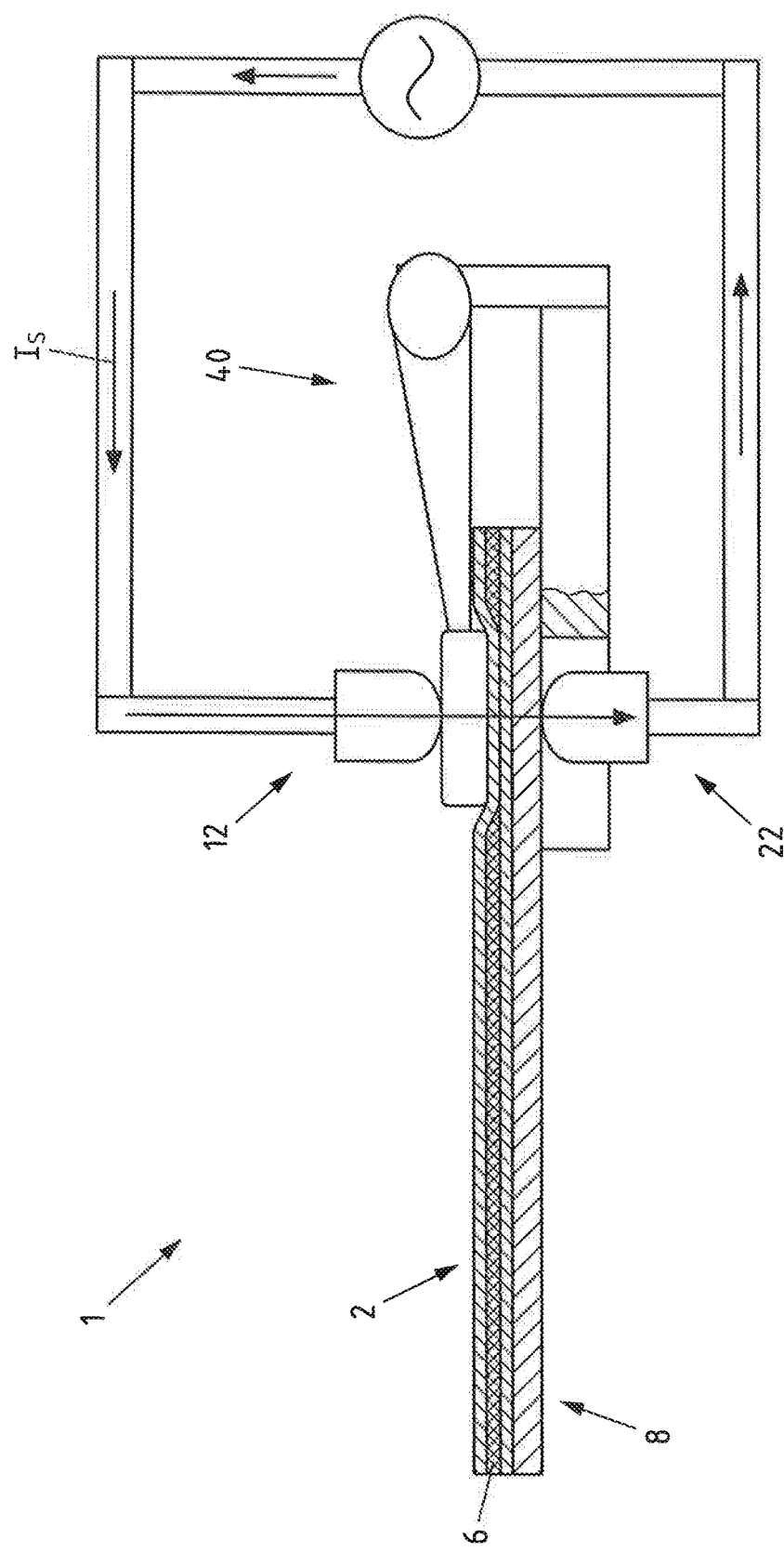

The present disclosure generally relates to methods for resistance welding sandwich sheet to other components, such as metallic components. In some examples, the sandwich sheet may have two metallic cover layers and a thermoplastic material layer disposed between the metallic cover layers. A region of the sandwich sheet to be welded may be heated by way of a preheating current such that the thermoplastic material layer softens and is displaced out of the welding region as a result of the cover layers being pressed together. Further, the cover layers may be welded to another component by way of a welding current via a first welding electrode of a first electrode arrangement and a second welding electrode of a second electrode arrangement.

The present disclosure also generally relates to devices that perform resistance welding of sandwich sheets, which may have two metallic cover layers and a thermoplastic material layer arranged between said metallic cover layers, to other components such as metallic components. Some of the example devices may comprise a first electrode arrangement with a first welding electrode and a second electrode arrangement with a second welding electrode, means for providing a welding current at least via the first welding electrode and the second welding electrode to produce a welded connection, and means for providing a preheating current such that a region of the sandwich sheet to be welded is heated such that the thermoplastic material layer softens and is displaced from the welding region when the cover layers are pressed together.

That said, some example methods may involve fixing the sandwich sheet and the further component fixed relative to one another by way of a clamping arrangement. The first electrode arrangement may at least temporarily make contact with an electrically conductive contacting region of the clamping arrangement such that a preheating current can flow via the clamping arrangement and that region of the sandwich sheet to be welded is heated by way of the preheating current.

Because the first electrode arrangement makes contact with the clamping arrangement, it is possible for a preheating current to flow from the first electrode arrangement via the clamping arrangement for example to the further component and to the second electrode arrangement. As a result, the preheating current can flow, bypassing the sandwich sheet, via the further component in the region to be welded. In this way, by way of the preheating current, the required current flow in the region of the region to be welded can be achieved without provoking delamination of the sandwich sheet, thus increasing process reliability. The heating of the region to be welded is in this case realized by way of the electrical resistance of the components and the transition resistance between the individual components, for example between the further component and the second welding electrode. Since the clamping arrangement simultaneously serves for the positioning of the components, said clamping arrangement can be utilized in an advantageous manner because no further component serving exclusively as a current bridge needs to be provided. Rather, the clamping arrangement simultaneously serves as a current bridge. This can simplify and accelerate the method. Finally, no modification of the welding electrode, for example in the form of heating devices, is necessary, which further simplifies the method. Such methods are easy to implement, are reliable, and enable short cycle times.

The clamping arrangement may, for example, comprise a clamp or a bracing means. For example, the clamping arrangement comprises a first and a second clamping arm that makes contact with the sandwich sheet and with the component respectively. The clamping arrangement may for example engage around the sandwich sheet and the further component. For example, the clamping arrangement has a closing mechanism that permits manual or automatic closure of the clamping arrangement. At least one clamping arrangement is provided. It is for example also possible for multiple clamping arrangements to be provided. For example, the clamping arrangement fixes the sandwich sheet and the further component only in regions or in parts, such that a restricted movement of the components relative to one another remains possible. To conduct the preheating current, the clamping arrangement is, for example, produced from electrically conductive material, or at least has electrically conductive regions.

The first electrode arrangement is, for example, arranged on the side of the sandwich sheet. The second electrode arrangement is for example arranged opposite the first electrode arrangement on that side of the further component that is averted from the sandwich sheet. For example, the welding electrodes may be set down onto the sandwich sheet or onto the component in the conventional manner such that, in the process, the first electrode arrangement automatically makes contact with the contacting region of the clamping arrangement.

The first welding electrode of the first electrode arrangement comprises, for example, a preferably elongate sleeve body and an electrode cap for making contact for example with the sandwich sheet. It is likewise possible for the second welding electrode of the second electrode arrangement to comprise, for example, a preferably elongate sleeve body and an electrode cap for making contact for example with the further component. The first and the second electrode arrangement may however also comprise further elements. Alternatively, the first and second electrode arrangement may also be composed of the first and second welding electrode.

For example, means are provided for exerting force on the welding electrodes, which means can exert a welding force in the direction of the components to be welded. For example, welding tongs are provided. Said means may simultaneously serve for the displacement of the thermoplastic material layer by way of the welding electrodes.

The further component is for example a sheet, preferably a solid sheet. For example, the further component is a steel sheet. The further component is to be understood to be at least one further component. Further components may additionally be provided, which are likewise connected in the welding process. The component may also be a sandwich sheet.

The contacting region is for example a contacting face of a contact element. The contact between the contacting region of the clamping arrangement and the first electrode arrangement is established for example at least during the preheating by way of the preheating current. It is optionally also possible for the contacting to be realized during the welding by way of the welding current.

In one refinement of the method according to the present disclosure, if the clamping arrangement makes electrically conductive contact with the further component on the side averted from the sandwich sheet, electrical contact between the clamping arrangement and the further component is achieved simply by fastening of the clamping arrangement, and the flow of the preheating current is made possible.

In a further refinement of the method according to the present disclosure, the clamping arrangement makes electrically conductive contact or electrically insulated contact with the sandwich sheet on the side averted from the further component. In the case of electrically conductive contact, it is for example possible for the first welding electrode to be connected in electrically conductive fashion to the sandwich sheet by way of the clamping arrangement, and for there to be no need for any direct contact between the welding electrode and sandwich sheet. In the case of electrically insulated contact between the clamping arrangement and the sandwich sheet, it is possible, for example during the preheating, for undesired branch currents via the sandwich sheet to be prevented.

In another example of the present disclosure, the sandwich sheet and the further component may be fixed relative to one another by way of multiple clamping arrangements simultaneously, wherein the first electrode arrangement for producing the respective welded connection makes contact with in each case one clamping arrangement via the respective electrically conductive contacting region, such that the respective region, which is to be welded, of the sandwich sheet is heated by way of the preheating current flowing via the respective clamping arrangement. In this way, the sandwich sheet and the further component can be fixed relative to one another initially by way of multiple clamping arrangements. Subsequently, the welding electrodes can be moved efficiently from clamping arrangement to clamping arrangement and weld in each case one region to be welded, without further clamping arrangements having to be positioned in the process.

In a further refinement of the method according to the present disclosure, the clamping arrangement is selected from a stock of clamping arrangements, and is positioned on the sandwich sheet and on the further component by a positioning system. In this way, the method can achieve short cycle times and high process reliability. The stock may for example comprise at least partially identical and/or at least partially different clamping arrangements. For example, a magazine of clamping arrangements is provided. For example, the positioning system comprises a robot arm that positions the clamping arrangement. This may, for example, be performed fully automatically, for example in a manner dependent on predetermined values and/or in a manner dependent on process parameters.

In a further refinement of the method according to the present disclosure, the second welding electrode, in particular an electrode cap of the second welding electrode, makes direct contact with the further component. For this purpose, the clamping arrangement is, in the region that makes contact with the further component, designed for example such that the second electrode can make contact with the further component despite fixing of the components by way of the clamping arrangement. For example, a corresponding recess is provided in that region of the clamping arrangement which makes contact with the further component. It is thus possible for the second welding electrode to be placed in contact with the further component for welding purposes in the conventional manner. In this way, the welding process on the side of the further component is not influenced, or is influenced only to a minor extent, by a clamping device arranged between the further component and the second welding electrode. In particular, this is possible whilst the first electrode arrangement is in contact with the electrically conductive contacting region of the clamping arrangement.

In a further refinement of the method according to the present disclosure, the welding current for the welding of the cover layers to the further component flows between the first welding electrode and the second welding electrode in such a way as to bypass the clamping arrangement. In particular, the first welding electrode may make direct contact with the sandwich sheet, and the second welding electrode may make direct contact with the further component, such that the clamping arrangement is not part of the electrical circuit for the welding current. In this way, the welding is performed in the conventional manner directly by way of the welding electrodes, such that a possibly cumbersome adaptation of process parameters can be avoided.

In a further refinement of the method according to the present disclosure, the electrically conductive contacting region of the clamping arrangement is arranged between the first welding electrode and the sandwich sheet, and the first welding electrode, in particular an electrode cap of the first welding electrode, makes contact with the electrically conductive contacting region of the clamping arrangement. Here, the electrically conductive contacting region may have different geometries or be composed of materials with different electrical conductivity. For example, the contacting region may be in the form of an electrode cap, and may serve for example as the electrode cap of the first welding electrode. In this way, at least partially indirect welding via the clamping arrangement is realized. As a result, it is thus possible for an adaptation of the welding process to different regions of the components to be realized by way of the design of the contacting region of the clamping arrangement. For example, if multiple clamping arrangements are provided, the contacting regions can be designed differently from welding region to welding region.

In a further refinement of the method according to the present disclosure, the electrically conductive contacting region of the clamping device is in the form of a sliding contact which makes lateral contact with the first electrode arrangement, in particular with the first welding electrode. It is achieved in this way that the first welding electrode can make contact with the sandwich sheet in the conventional manner, and the contacting of the clamping arrangement can be realized in a secondary manner via the side of the electrode arrangement. Lateral contacting may be realized for example by way of contacting of the sleeve body of the first welding electrode. For this purpose, it may be necessary for the first electrode arrangement to be pressed against the electrically conductive contacting region or vice versa. This may be realized with a force transversely with respect to the welding force to which the first welding electrode is subjected during the preheating or during the welding. During the movement of the welding electrode in the direction of the welding force that is exerted on it, the welding electrode may for example slide by way of its sleeve body along the sliding contact.

The electrically conductive contacting region of the clamping arrangement is preferably provided by a contact element of elastic design. The clamping arrangement preferably comprises a damping system which can absorb the force exerted on the clamping arrangement by the first electrode arrangement during the lateral exertion of contact pressure.

In a further refinement of the method according to the present disclosure, the first electrode arrangement comprises a set-down electrode which is connected in electrically conductive fashion to the first welding electrode and which makes contact with the electrically conductive contacting region of the clamping arrangement. In this way, the region to be welded and the region fixed by way of the clamping arrangement can be arranged relative to one another in a particularly flexible manner because the additional set-down electrode permits contacting of the clamping arrangement at a location remote from the first welding electrode.

In a further refinement of the method according to the present disclosure, the electrically conductive contacting region of the clamping arrangement is mounted movably, in particular by way of an elastic counterbearing, in the clamping arrangement. This may serve for the compensation of eccentric introductions of force by the set-down electrode into the clamping arrangement, such that, for example, compensation of the force of a set-down electrode that is not making planar contact can be realized. The counterbearing is for example electrically non-conductive. For example, a bypass element may be provided which produces electrically conductive contact between the contacting region and the rest of the clamping arrangement. Alternatively or in addition, it is likewise possible for the set-down electrode to be mounted in movable, in particular resilient fashion.

In a further refinement of the method according to the present disclosure, the welding electrode of the first electrode arrangement makes contact in positively locking fashion with the electrically conductive contacting region of the clamping device. In this way, it is possible to realize a large region of contact between the first electrode arrangement and the contacting region. For example, a contact element having a recess for the electrode cap of the first welding electrode is provided, such that the first welding electrode can make contact both with the contact element and with the sandwich sheet. Here, the geometry is, for example, configured such that the first welding electrode, as it moves into the recess, can establish contact with the contact element. For example, the electrode cap of the first welding electrode has an oversize in relation to the recess. For example, as contact element, use is made of contacting bands provided with a recess.

According to another example, the object mentioned in the introduction is achieved, in the case of a generic device, in that a clamping arrangement for the relative fixing of the sandwich sheet and of the further component is provided, wherein the clamping arrangement has an electrically conductive contacting region for the at least temporary contacting of the first electrode arrangement, and wherein the clamping arrangement is designed for conducting the preheating current. As already discussed with regard to the method, by virtue of the fact that the clamping arrangement can make contact with the clamping arrangement by way of the first electrode arrangement, and the clamping arrangement simultaneously serves as a current bridge, the end result is that a device is provided which is easy to realize and which makes it possible to implement a method which is reliable in terms of a process and which can achieve short cycle times.

Those having ordinary skill in the art will understand that example devices may in some cases be designed to perform some of the example methods set forth herein, or advantageous refinements thereof.

The device preferably comprises means for displacing the plastics layer of the sandwich sheet out of that region of the sandwich sheet that is to be welded. For example, the first and the second electrode arrangement may, by way of welding tongs or a welding robot, be subjected to a force in the direction of the components to be welded.

The clamping arrangement is preferably designed for making electrically conductive contact with the further component on the side averted from the sandwich sheet, in order for electrical contact between the clamping arrangement and the further component to be realized simply by fastening of the clamping arrangement.

The clamping arrangement is preferably designed for making electrically conductive or electrically insulated contact with the sandwich sheet on the side averted from the further component. In the case of electrically conductive contact, it is for example possible for the first welding electrode to be connected in electrically conductive fashion to the sandwich sheet by way of the clamping arrangement. In the case of electrically insulated contact between the clamping arrangement and the sandwich sheet, it is possible, during the preheating, for undesired branch currents via the sandwich sheet to be prevented.

It is preferable for multiple clamping arrangements to be provided simultaneously for the relative fixing of the sandwich sheet and of the further component, wherein the first electrode arrangement for producing the respective welded connection can make contact with in each case one clamping arrangement via the respective electrically conductive contacting region, such that the preheating current for heating the respective sandwich sheet region to be welded can flow via the respective clamping arrangement. In this way, the welding electrodes can be moved efficiently from clamping arrangement to clamping arrangement.

In one refinement of the device according to the present disclosure, a stock of clamping arrangements is provided for the selection of the clamping arrangement, and a positioning system is provided for the positioning of the clamping arrangement on the sandwich sheet and on the further component, whereby the method can achieve short cycle times and high process reliability.

In one refinement of the device according to the present disclosure, the clamping arrangement is designed such that the second welding electrode, in particular an electrode cap of the second welding electrode, can make direct contact with the further component, whereby the second welding electrode can, in the conventional manner, be placed in contact with the further component for the welding process.

The device is preferably designed such that the welding current for the welding of the cover layers to the further component flows between the first welding electrode and the second welding electrode so as to bypass the clamping arrangement, whereby the welding can, in the conventional manner, be realized directly by way of the welding electrodes.

In one refinement of the device according to the present disclosure, the first electrode arrangement and the clamping arrangement are designed such that the electrically conductive contacting region of the clamping arrangement can be arranged between the first welding electrode and the sandwich sheet, and the first welding electrode, in particular an electrode cap of the first welding electrode, can make contact with the electrically conductive contacting region of the clamping arrangement. By means of the refinement of the contacting region of the clamping arrangement, it is thus possible to realize an adaptation of the welding process to different regions of the components.

In one refinement of the device according to the present disclosure, the electrically conductive contacting region of the clamping device is in the form of a sliding contact for making lateral contact with the first electrode arrangement, in particular with the first welding electrode. It can be achieved in this way that the first welding electrode can make contact with the sandwich sheet in the conventional manner.

In one refinement of the device according to the present disclosure, the first electrode arrangement comprises a set-down electrode which is connected in electrically conductive fashion to the first welding electrode and which is designed for making contact with the electrically conductive contacting region of the clamping arrangement. In this way, the region to be welded and the region fixed by way of the clamping arrangement may be arranged relative to one another in a particularly flexible manner.

The electrically conductive contacting region of the clamping arrangement is preferably mounted movably, in particular by way of an elastic counterbearing, in the clamping arrangement, which may serve for the compensation of eccentric introduction of force by the set-down electrode into the clamping arrangement.

In one refinement of the device according to the present disclosure, the electrically conductive contacting region of the clamping device is designed for making contact with the welding electrode of the first electrode arrangement in positively locking fashion, whereby a large region of contact between the first electrode arrangement and the contacting region can be realized.

It is also the intention for corresponding means for carrying out the method steps by way of examples of the device to be disclosed. Likewise, by way of the disclosure of means for carrying out a method step, it is the intention for the corresponding method step to be disclosed.

With reference now to the figures, FIGS. 1a-c firstly show a schematic sectional view of an example device 1 for carrying out an example method, at different points in time. FIG. 1a shows a sandwich sheet 2 with two metallic cover layers 4 and 5 and, arranged in between, a thermoplastic material layer 6 that is to be welded to a further metallic component 8, which in this case is in the form of a solid sheet. The two components 2, 8 are placed into the device 1 and are arranged between a first electrode arrangement 10 and a second electrode arrangement 20. The first electrode arrangement 10 comprises a first welding electrode 12 with a sleeve body 14 and an electrode cap 16. The second electrode arrangement 20 comprises a second welding electrode 22 with a sleeve body 24 and an electrode cap 26. The device furthermore comprises means for providing a welding current via the first welding electrode 12 and the second welding electrode 22, said means being in the form of a current source 30 and electrical lines 32. The current source 30 and the electrical lines 32 simultaneously serve as means for providing a preheating current.

The device 1 furthermore comprises a clamping arrangement 40 for the relative fixing of the sandwich sheet 2 and of the further component 8. The clamping arrangement 40 has an electrically conductive contacting region 42 for the contacting of the first electrode arrangement 10. The contacting region 42 is in this case provided by way of an electrically conductive contact element 44 that can be arranged between the first welding electrode 12 and the sandwich sheet 2. The clamping arrangement 40 is in this case in the form of a clamp with a first clamping arm 46, which makes electrically conductive contact with the sandwich sheet 2 via the contact element 44, and a second clamping arm 48, which makes electrically conductive contact with the further component 8. Furthermore, the clamping arrangement 40 has a closing mechanism 50 such that the clamping arms 46, 48 can engage around and fix the components 2, 8. Here, the second clamping arm 48 is, by way of a recess 52, formed such that the second welding electrode 22 can still make direct contact with the further component 8.

The device 1 furthermore comprises welding tongs or a welding robot (not illustrated) which can exert a force on the welding electrodes 12, 22 in the direction of the components.

FIG. 1b shows the device 1 during the preheating by way of the preheating current Iv, the path of which is illustrated in FIG. 1b by the arrows. The preheating current flows via the first welding electrode 12 of the first electrode arrangement 10, the clamping arrangement 40, the further component 8 and the second welding electrode 22 of the second electrode arrangement 20. The clamping arrangement 40 is designed to conduct the preheating current Iv. The clamping arrangement can thus simultaneously be used as a current bridge. Furthermore, the preheating current Iv does not need to be conducted via the sandwich sheet 2, thus preventing damage to the sandwich sheet 2. Owing to the electrical resistance, in particular of the further component 8, or owing to the transition resistances, in particular between the further component 8 and the second welding electrode 22, that region of the sandwich sheet 2 which is to be welded is heated by way of the preheating current Iv such that the thermoplastic material layer 6 softens.

As illustrated in FIG. 1c, the first welding electrode 12 exerts a force on the sandwich sheet 2 via the contact element 44, whereby the cover layers 4, 5 may be pressed together. As a result of the cover layers 4, 5 being pressed together, the thermoplastic material layer 6 is displaced out of the welding region. Subsequently, the cover layers 4, 5 are welded to the further component 8 by way of a welding current Is, the path of which is illustrated in FIG. 1c by the arrows, via the first welding electrode 12 of the first electrode arrangement 10 and the second welding electrode 22 of the second electrode arrangement 20. In this case, the welding current Is flows via the contact element 44 of the clamping arrangement 40.

Figure 2:
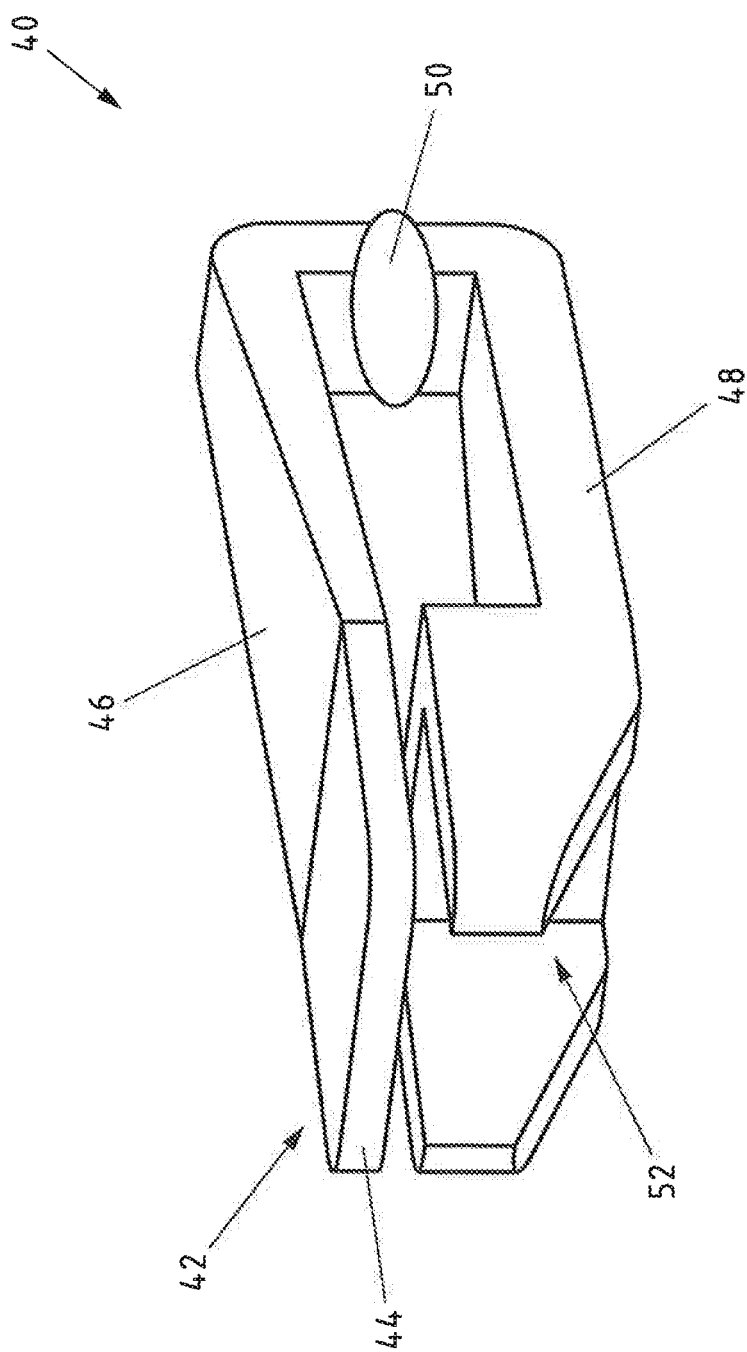
FIG. 2 is a perspective view of a clamping arrangement of FIG. 1.

FIG. 2 shows a perspective view of the clamping arrangement 40 from FIG. 1. Here, it is possible in particular to see the recess 52 that is adapted to the welding electrode 22, and it is possible for the second welding electrode 22 to make contact with the further component 8.

Figure 3A:
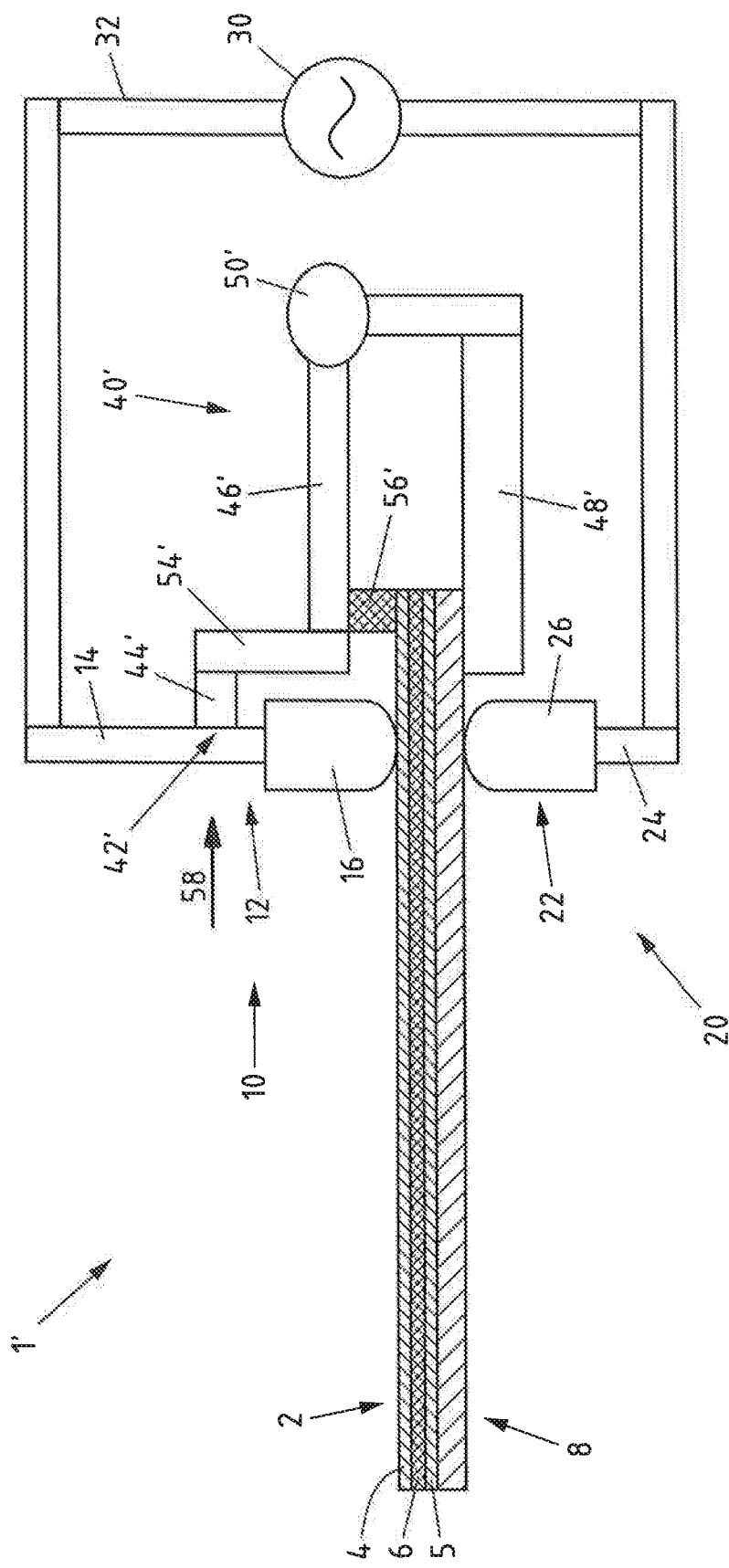
FIGS. 3a-c are schematic sectional views of an example device for performing another example method.
Figure 3B:
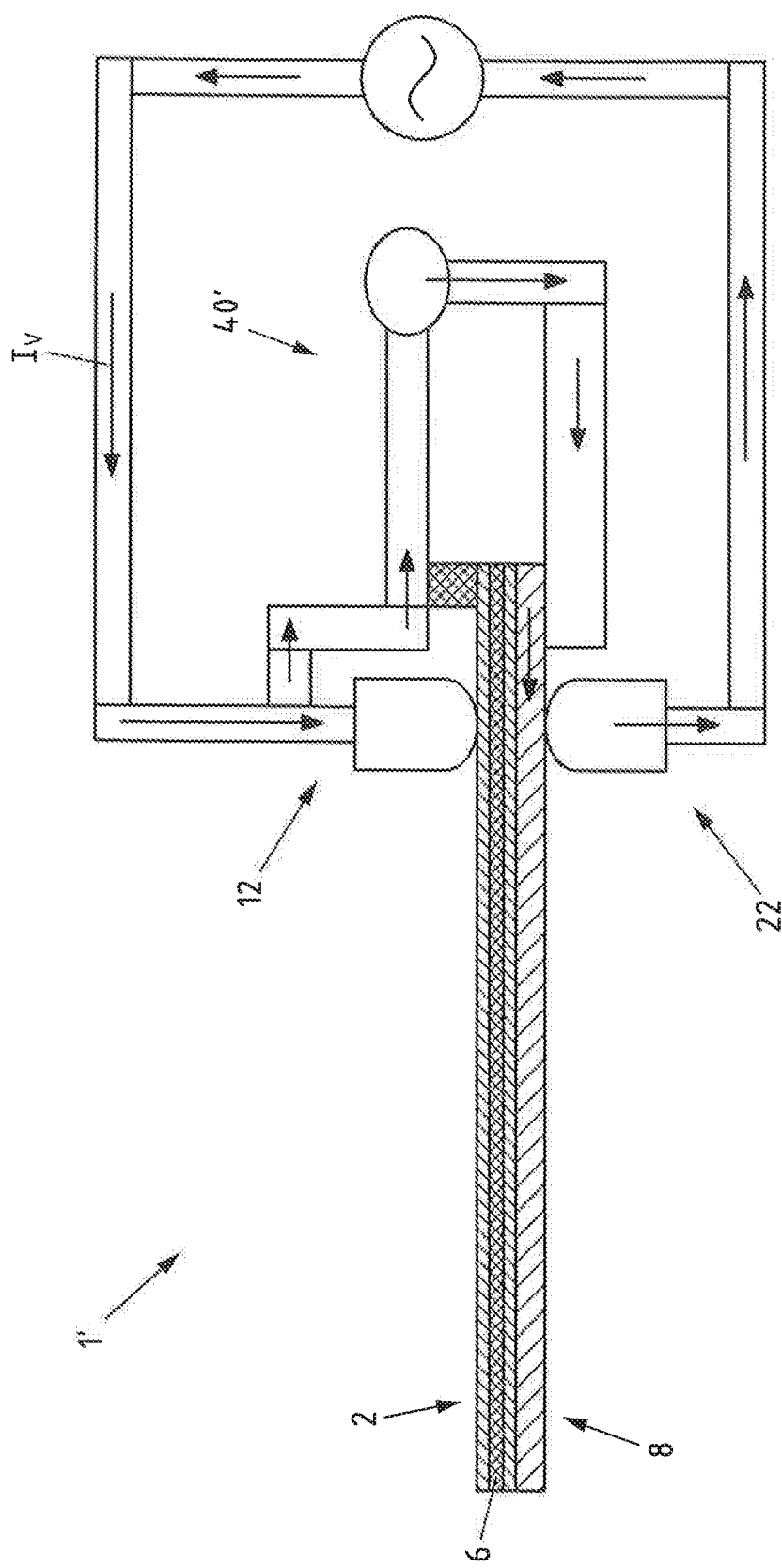
Figure 3C:
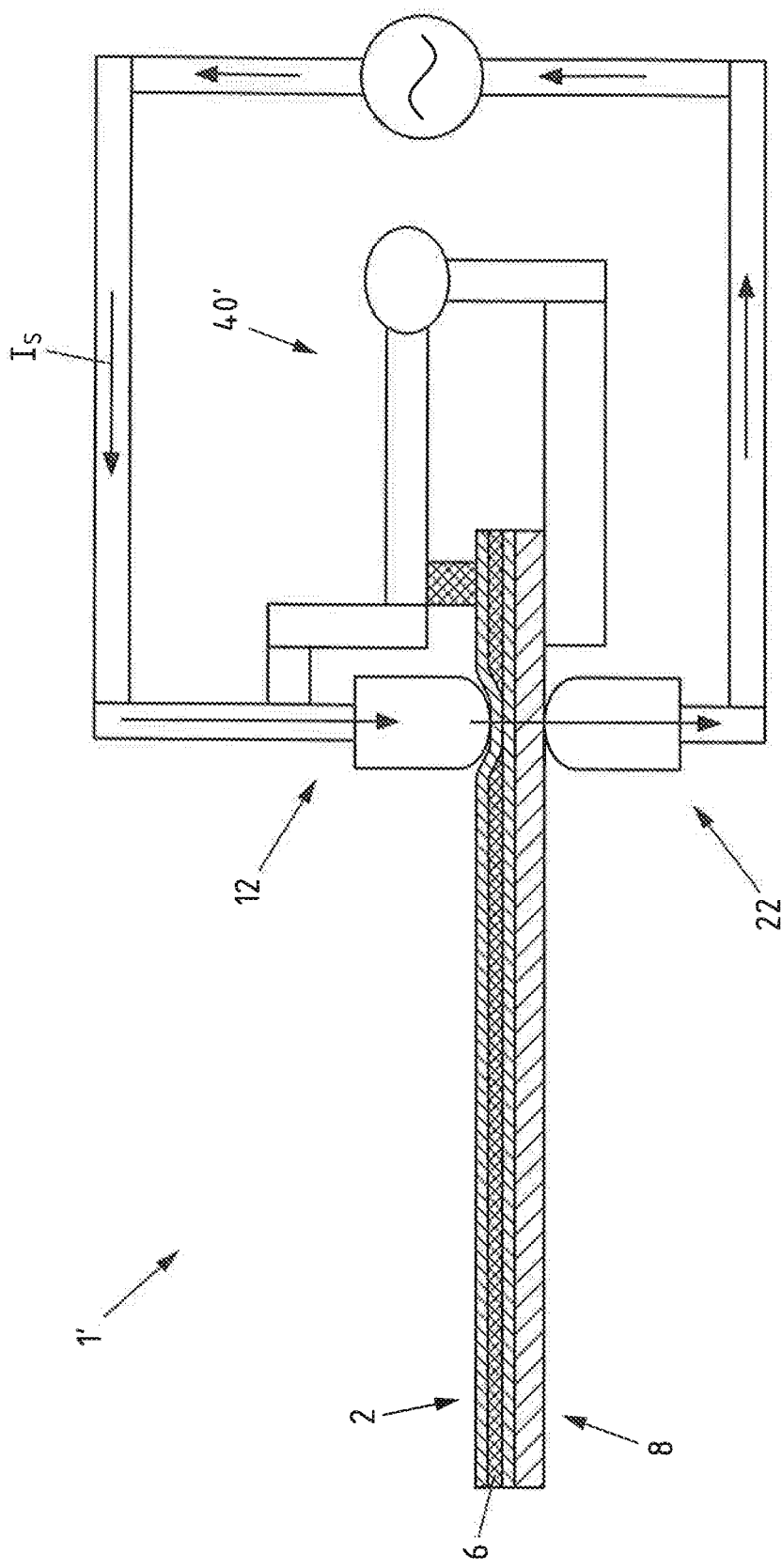

FIGS. 3a-c show a schematic sectional view of an example device 1' for carrying out another example method. By contrast to the device 1, the device 1' has a modified clamping arrangement 40' for the relative fixing of the sandwich sheet 2 and of the further component 8. The clamping arrangement 40' has an electrically conductive contacting region 42' for the contacting of the first electrode arrangement 10. The contacting region 42' is provided by an electrically conductive contact element 44', which can make lateral contact with the sleeve body 14 of the first welding electrode 12. The clamping arrangement 40' furthermore has a damping element 54', which may for example comprise elastic elements such as spring elements. In this way, a force that is exerted by the welding electrode 12 on the contact element 44' in the direction of the arrow 58 for the purposes of better contacting can be compensated. The first clamping arm 46' of the clamping arrangement 40 in this case makes contact with the sandwich sheet 2 in electrically insulated fashion via the insulator 56'. The second clamping arm 48' in turn makes contact with the further component 8 in electrically conductive fashion.

Otherwise, the device 1' and the clamping arrangement 40' are of similar construction to those shown in FIG. 1, such that reference is made to the description in that regard.

FIG. 3b shows the device 1' during the preheating by way of the preheating current Iv, the path of which is in turn illustrated by the arrows in FIG. 3b. The preheating current Iv flows via the first welding electrode 12 of the first electrode arrangement 10, the clamping arrangement 40', the further component 8 and the second welding electrode 22 of the second electrode arrangement 20. The preheating current Iv does not need to be conducted via the sandwich sheet 2. As already described, that region of the sandwich sheet 2 that is to be welded is heated by way of the preheating current Iv such that the thermoplastic material layer 6 softens.

As illustrated in FIG. 3c, the first welding electrode 12 exerts a force directly on the sandwich sheet 2, whereby the cover layers 4, 5 are pressed together. As a result of the cover layers 4, 5 being pressed together, the thermoplastic material layer 6 is displaced out of the welding region. Subsequently, the cover layers 4, 5 are welded to the further component 8 by way of a welding current Is, the path of which is illustrated in FIG. 3c by the arrows, via the first welding electrode 12 of the first electrode arrangement 10 and the second welding electrode 22 of the second electrode arrangement 20. The electrode caps 16, 26 can, in a conventional manner, for instance, make direct contact with the components 2, 8 to be welded, such that no adaptation of the welding parameters is required. In this case, the welding current Is does not flow via the clamping arrangement 40'.

FIG. 4 shows a perspective view of the clamping arrangement 40' from FIG. 3. Here, it can be seen that the electrically conductive contact elements 44', or the contacting region 42', may also be of two-part or split form. In this way, it is for example possible for two welded connections to be formed by way of one clamping arrangement.

Figure 5A:
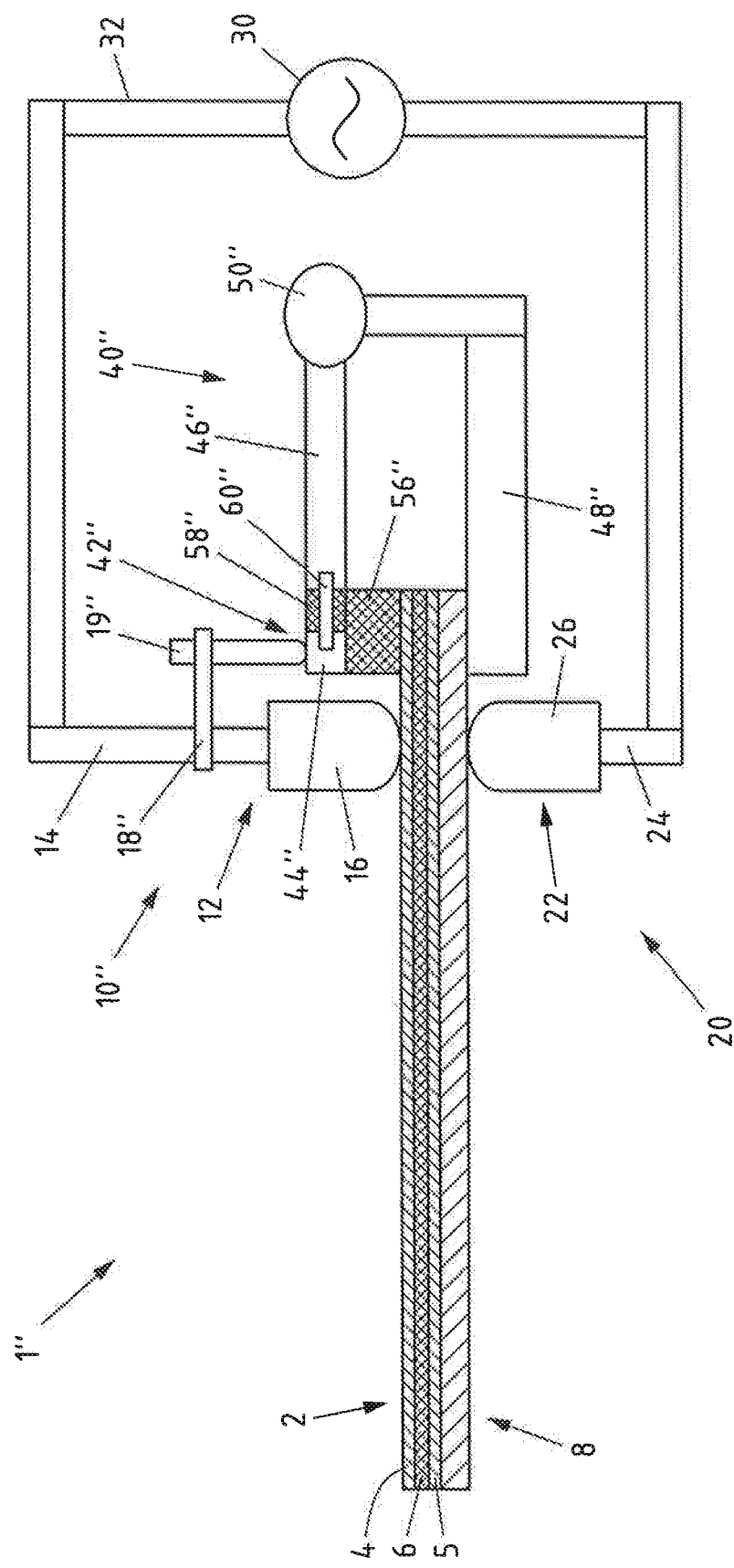
FIGS. 5a-c are schematic sectional views of an example device for performing still another example method.
Figure 5B:
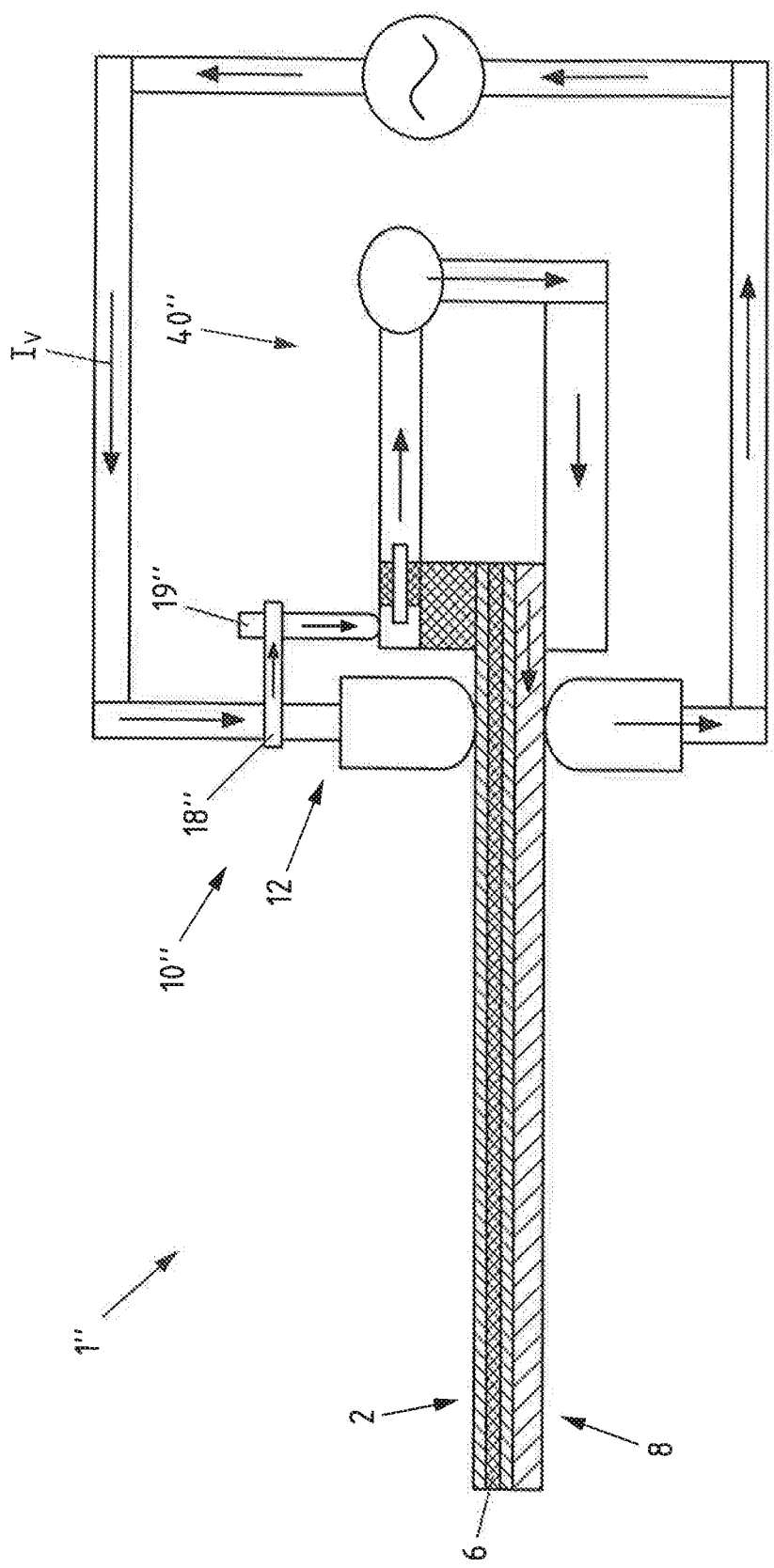
Figure 5C:
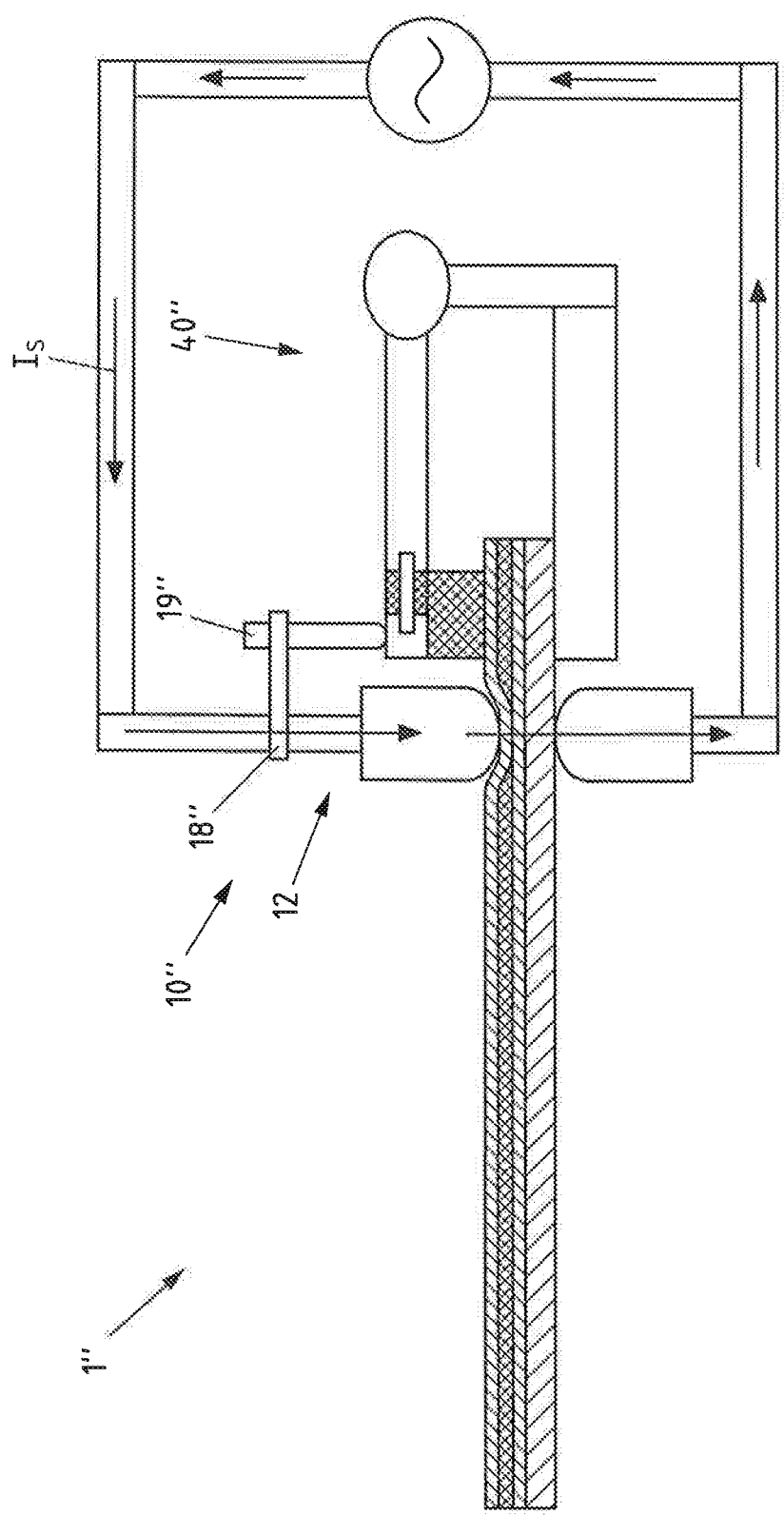

FIGS. 5a-c show a schematic sectional view of an example device 1" for carrying out still another example method. By contrast to the device 1', the device 1" has a modified clamping arrangement 40" for the relative fixing of the sandwich sheet 2 and of the further component 8. Furthermore, the electrode arrangement 10" is supplemented by an additional set-down electrode 19" that is connected in electrically conductive fashion to the sleeve shank 14 of the first welding electrode 12 by way of the connecting element 18". The clamping arrangement 40" has an electrically conductive contacting region 42" for the contacting of the set-down electrode 19" of the first electrode arrangement 10". The contacting region 42" is provided by an electrically conductive contact element 44". The clamping arrangement 40" furthermore has an elastic, non-conductive counterbearing 58" that serves for the compensation of eccentrically introduced forces of the set-down electrode 19". For the electrical connection of the contact element 44" and of the first clamping arm 46", an electrically conductive bypass element 60" is also provided. The first clamping arm 46" of the clamping arrangement 40" in turn makes contact with the sandwich sheet 2 in electrically insulated fashion by way of an insulator 56". The second clamping arm 48" in turn makes contact with the further component 8 in electrically conductive fashion.

Otherwise, the device 1" and the clamping arrangement 40" are of similar construction to those shown in FIGS. 1 and 3, such that reference is made to the description in that regard.

FIG. 5b shows the device 1" during the preheating by way of the preheating current Iv, the path of which is in turn illustrated by the arrows in FIG. 5b. The preheating current Iv flows via the sleeve body 14 of the first welding electrode 12 of the first electrode arrangement 10", the set-down electrode 19", the clamping arrangement 40", the further component 8 and the second welding electrode 22 of the second electrode arrangement 20. The preheating current Iv does not need to be conducted via the sandwich sheet 2. As already described, that region of the sandwich sheet 2 that is to be welded is heated by way of the preheating current Iv such that the thermoplastic material layer 6 softens.

As illustrated in FIG. 5c, the first welding electrode 12 exerts a force directly on the sandwich sheet 2, whereby the cover layers 4, 5 are pressed together. As a result of the cover layers 4, 5 being pressed together, the thermoplastic material layer 6 is displaced out of the welding region. Subsequently, the cover layers 4, 5 are welded to the further component 8 by way of a welding current Is, the path of which is illustrated in FIG. 5c by the arrows, via the first welding electrode 12 of the first electrode arrangement 10" and the second welding electrode 22 of the second electrode arrangement 20. The electrode caps 16, 26 can, in a conventional manner, for instance, make direct contact with the components 2, 8 to be welded, such that no adaptation of the welding parameters is required. In this case, the welding current Is does not flow via the clamping arrangement 40".

FIG. 6 shows a perspective view of the clamping arrangement 40" from FIG. 5. Here, in particular, the bypass element 60" for the electrically conductive connection of the contact element 44" to the first clamping arm 46" is illustrated.

Figure 7A:
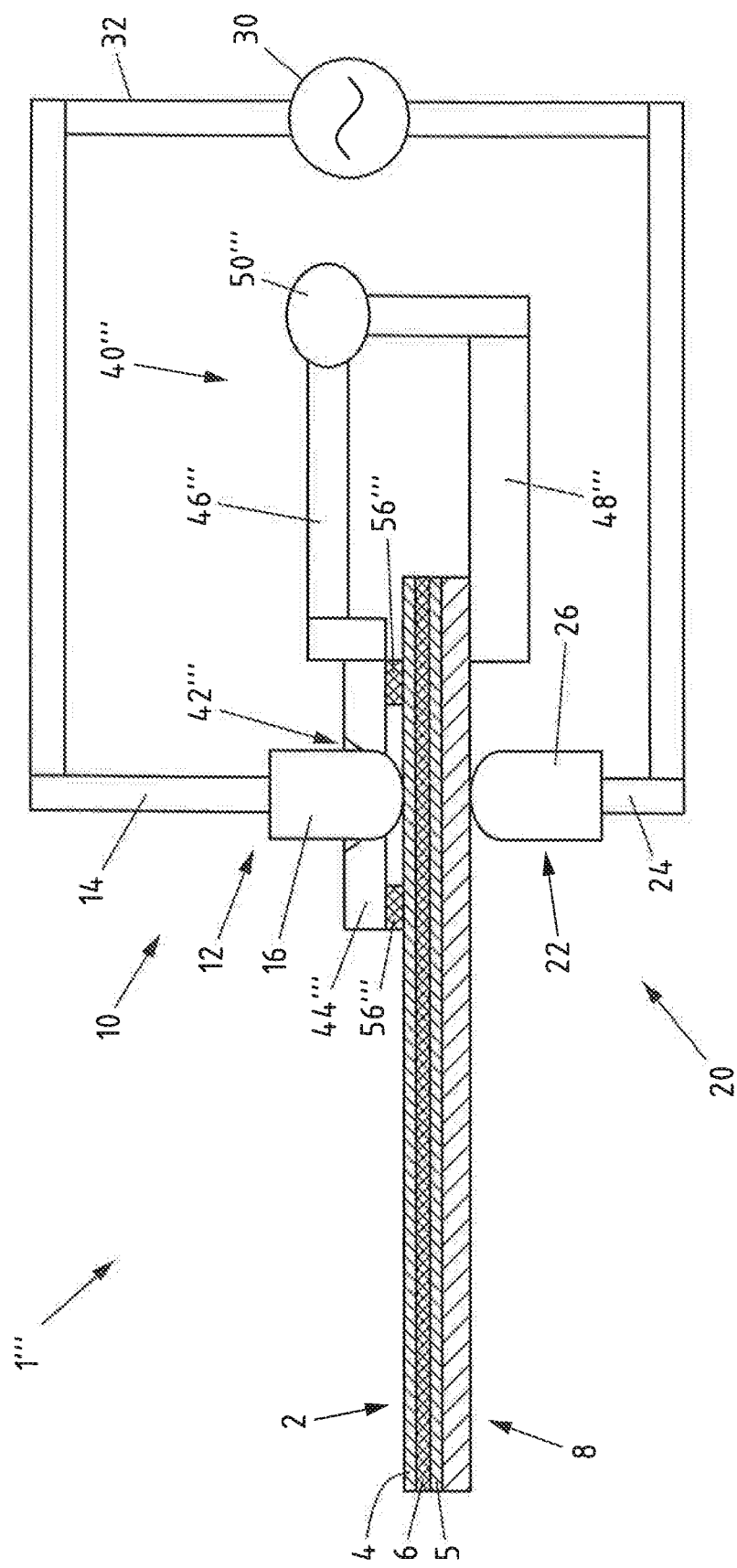
FIGS. 7a-c are schematic sectional views of an example device for performing yet another example method.
Figure 7B:
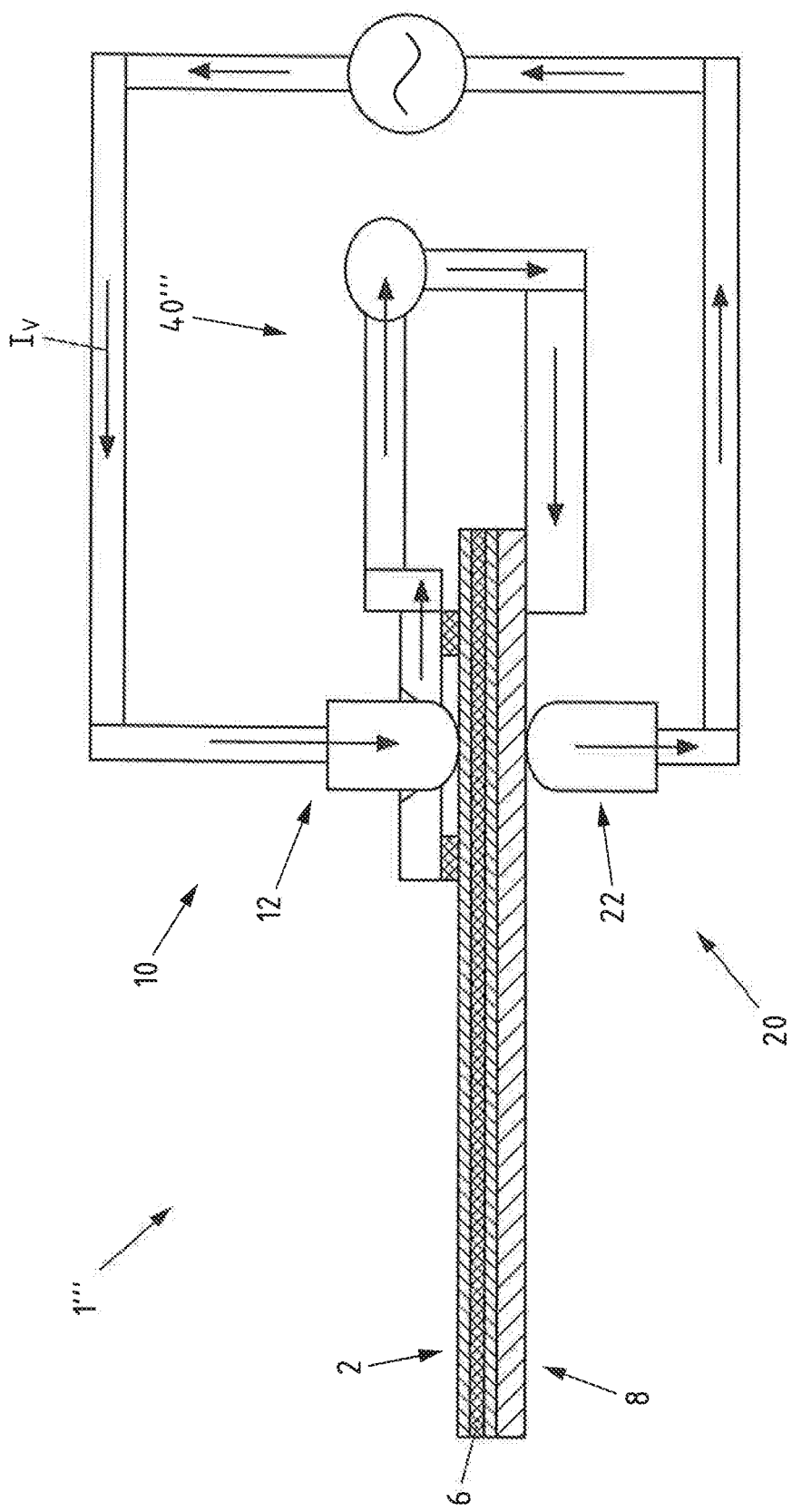
Figure 7C:
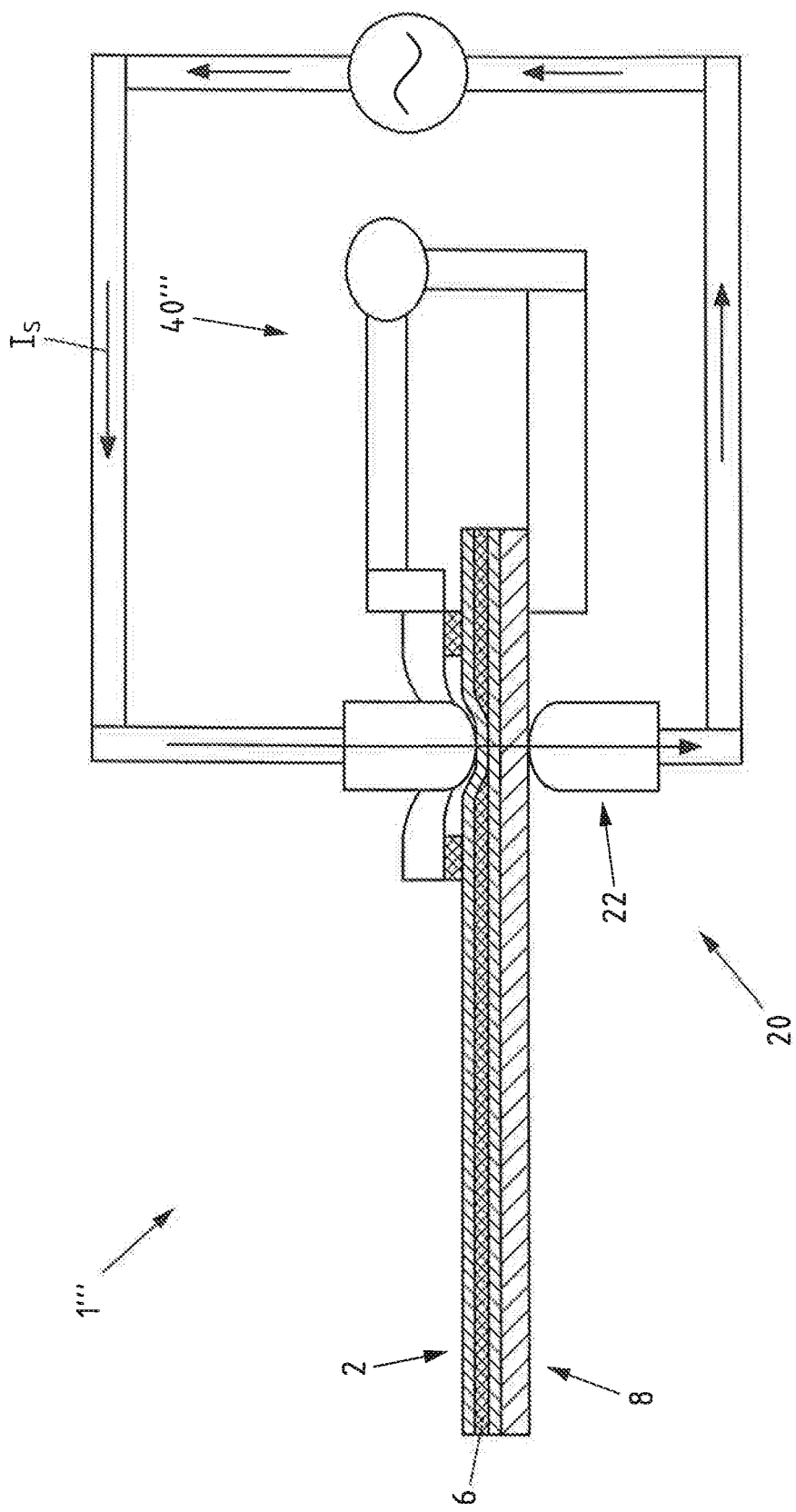

FIGS. 7a-c show a schematic sectional view of an example device 1''' for carrying out another example method. By contrast to the devices 1' and 1", the device 1''' has a modified clamping arrangement 40''' for the relative fixing of the sandwich sheet 2 and of the further component 8. The clamping arrangement 40''' has an electrically conductive contacting region 42''' for the contacting of the electrode cap 16 of the first welding electrode 12 of the first electrode arrangement 10. The contacting region 42' is provided by an electrically conductive contact element 44'. Here, the contact element 44''' is designed for positively locking connection to the electrode cap 16. For this purpose, a recess 62''' is provided in the contact element 44''', the inner circumferential face of which forms the contacting region 42'''. The contact element 44''' may for example be in the form of a contacting band. The contact element 44''' is separated from the sandwich sheet 2 by way of the insulator 56'''. The first clamping arm 46''' of the clamping arrangement 40''' makes contact with the sandwich sheet 2 likewise in only electrically insulated fashion by way of the insulator 56'''. The second clamping arm 48' in turn makes contact with the further component 8 in electrically conductive fashion.

Otherwise, the device 1''' and the clamping arrangement 40''' are of similar construction to those shown in FIGS. 1, 3 and 5 respectively, such that reference is made to the description in that regard.

FIG. 7b shows the device 1''' during the preheating by way of the preheating current Iv, the path of which is in turn illustrated by the arrows in FIG. 7b. The preheating current Iv flows via the first welding electrode 12 of the first electrode arrangement 10, the clamping arrangement 40", the further component 8 and the second welding electrode 22 of the second electrode arrangement 20. The preheating current Iv does not need to be conducted via the sandwich sheet 2. As already described, that region of the sandwich sheet 2 that is to be welded is heated by way of the preheating current Iv such that the thermoplastic material layer 6 softens.

As illustrated in FIG. 7c, the first welding electrode 12 exerts a force directly on the sandwich sheet 2, whereby the cover layers 4, 5 are pressed together. As a result of the cover layers 4, 5 being pressed together, the thermoplastic material layer 6 is displaced out of the welding region. Subsequently, the cover layers 4, 5 are welded to the further component 8 by way of a welding current Is, the path of which is illustrated in FIG. 7c by the arrows, via the first welding electrode 12 of the first electrode arrangement 10 and the second welding electrode 22 of the second electrode arrangement 20. The electrode caps 16, 26 can, in a conventional manner, for instance, make direct contact with the components 2, 8 to be welded, such that no adaptation of the welding parameters is required. In this case, the welding current Is does not flow via the clamping arrangement 40'''.

FIG. 8 shows a partial plan view of the clamping arrangement 40''' from FIG. 7. Here, it is possible to see the recess 62''' into which the first welding electrode 12 can be introduced in order to realize positively locking contacting of the contacting region 42'''.

What is claimed is:

1. A method for resistance welding a sandwich sheet to a metallic component, wherein the sandwich sheet comprises a thermoplastic material layer disposed between two metallic cover layers, the method comprising:
   using a clamping arrangement to secure the sandwich sheet relative to the metallic component, the clamping arrangement comprising a first arm and a second arm, wherein the first arm comprises an electrically conductive contacting region;
   heating a region of the sandwich sheet to be welded by way of a preheating current so as to soften the thermoplastic material layer, wherein a first electrode of a first electrode arrangement directly contacts the electrically conductive contacting region of the clamping arrangement so that the preheating current flows via a brace or a clamp of the clamping arrangement and the preheating current does not flow via the sandwich sheet;

compressing the two metallic cover layers in the region to be welded so as to displace the thermoplastic material layer out of the region; and welding at least one of the two metallic cover layers to the metallic component by way of a welding current via the first welding electrode of the first electrode arrangement and a second welding electrode of a second electrode arrangement.

2. The method of claim 1 wherein the clamping arrangement makes electrically conductive contact with the metallic component on a side opposite to the sandwich sheet.

3. The method of claim 1 wherein the clamping arrangement makes electrically conductive contact or electrically insulated contact with the sandwich sheet on a side opposite to the metallic component.

4. The method of claim 1 further comprising using multiple clamping arrangements simultaneously to secure the sandwich sheet relative to the metallic component, wherein the first electrode arrangement makes contact with the clamping arrangement via the electrically conductive contacting region of the clamping arrangement such that the region of the sandwich sheet to be welded is heated by way of the preheating current flowing via the clamping arrangement.

5. The method of claim 1 further comprising:
selecting the clamping arrangement from a stock of clamping arrangements; and
positioning the clamping arrangement on or about the sandwich sheet and the metallic component with a positioning system.

6. The method of claim 1 wherein an electrode cap of the second welding electrode directly contacts the metallic component.

7. The method of claim 1 wherein the welding current for the welding of the at least one of the two metallic cover layers to the metallic component flows between the first welding electrode and the second welding electrode-through at least one of the two metallic cover layers and the metallic component and bypasses the clamping arrangement.

8. The method of claim 1 further comprising arranging the electrically conductive contacting region of the clamping arrangement between the first welding electrode and the sandwich sheet, wherein an electrode cap of the first welding electrode contacts the electrically conductive contacting region of the clamping region.

9. The method of claim 1 wherein the electrically conductive contacting region of the clamping device is configured as a sliding contact that makes lateral contact with the first welding electrode of the first electrode arrangement.

10. The method of claim 1 wherein the first electrode arrangement comprises a set-down electrode that is electrically connected to the first welding electrode and contacts the electrically conductive contacting region of the clamping arrangement.

11. The method of claim 10 further comprising movably mounting the electrically conductive contacting region of the clamping arrangement by way of an elastic counterbearing.

12. The method of claim 1 wherein the first welding electrode contacts the electrically conductive contacting region of the clamping arrangement in a positively locking fashion.

13. A device for resistance welding a sandwich sheet to a metallic component, wherein the sandwich sheet comprises a thermoplastic material layer disposed between two metallic cover layers, the device comprising:
a first electrode arrangement including a first welding electrode;
a second electrode arrangement including a second welding electrode;
circuitry configured to generate and transmit a welding current at least via the first welding electrode and the second welding electrode for producing a welded connection, wherein the circuitry is configured to generate a preheating current for heating a region of the sandwich sheet to be welded, with the preheating current capable of softening the thermoplastic material layer to an extent that the thermoplastic material layer is displaceable from the region when the two metallic cover layers are compressed; and
a clamping arrangement for securing the sandwich sheet relative to the metallic component, wherein the clamping arrangement comprises a first arm, a second arm, and a closing mechanism, wherein the first arm comprises an electrically conductive contacting region that directly contacts the first electrode arrangement and is disposed between the first electrode arrangement and one of the metallic layers, wherein the clamping arrangement is configured to conduct the preheating current generated by the circuitry, wherein the closing mechanism secures the clamping arrangement around the sandwich sheet and the metallic component, and wherein the preheating current flows via a brace or clamp of the clamping arrangement and does not flow via the sandwich sheet.

14. The device of claim 13 wherein the clamping arrangement is selected from a stock of clamping arrangements, wherein the device further comprises a positioning system for positioning the clamping arrangement on or about the sandwich sheet and the metallic component.

15. The device of claim 13 wherein a configuration of the clamping arrangement permits an electrode cap of the second welding electrode to directly contact the metallic component.

16. The device of claim 13 wherein the first electrode arrangement and the clamping arrangement are configured such that the electrically conductive contacting region of the clamping arrangement is positionable between the first welding electrode and the sandwich sheet, wherein an electrode cap of the first welding electrode contacts the electrically conductive contacting region of the clamping arrangement.

17. The device of claim 13 wherein the electrically conductive contacting region of the clamping arrangement is a sliding contact that makes lateral contact with the first welding electrode of the first electrode arrangement.

18. The device of claim 13 wherein the first electrode arrangement comprises a set-down electrode that is electrically connected to the first welding electrode and is configured to contact the electrically conductive contacting region of the clamping arrangement.

19. The device of claim 13 wherein the electrically conductive contacting region of the clamping device is configured to contact the first welding electrode of the first electrode arrangement in a positively locking fashion.

20. The method of claim 1, wherein the clamping arrangement comprises a first arm in contact with a top face of the sandwich sheet and a second arm in contact with an opposing bottom face of the metallic component.

* * * * *